United States Patent [19]
Soltani et al.

[11] Patent Number: 5,124,558
[45] Date of Patent: Jun. 23, 1992

[54] IMAGING SYSTEM FOR MAMOGRAPHY EMPLOYING ELECTRON TRAPPING MATERIALS

[75] Inventors: Peter K. Soltani, Olney, Md.; George M. Storti, Washington, D.C.; Joseph Lindmayer, Potomac, Md.

[73] Assignee: Quantex Corporation, Rockville, Md.

[21] Appl. No.: 723,603

[22] Filed: Jul. 1, 1991

Related U.S. Application Data

[63] Continuation-in-part of Ser. No. 383,534, Jul. 24, 1990, Pat. No. 5,028,793, which is a continuation-in-part of Ser. No. 203,324, Jun. 7, 1988, Pat. No. 4,983,834, which is a continuation-in-part of Ser. No. 85,465, Aug. 14, 1987, Pat. No. 4,812,660, and a continuation-in-part of Ser. No. 34,333, Mar. 3, 1987, Pat. No. 4,822,520.

[51] Int. Cl.$^5$ .............................................. H05B 33/00
[52] U.S. Cl. .............................. 250/484.1; 250/327.2; 378/37
[58] Field of Search .................... 250/484.1, 327.2; 378/37

[56] References Cited

U.S. PATENT DOCUMENTS

| | | | |
|---|---|---|---|
| 4,400,619 | 8/1983 | Kotera et al. | 250/484.1 |
| 4,835,386 | 5/1989 | Shimura et al. | 250/484.1 |
| 4,855,603 | 8/1989 | Lindmayer | 250/484.1 |
| 4,947,465 | 8/1990 | Mathur et al. | 250/337 |

Primary Examiner—Carolyn E. Fields
Assistant Examiner—Drew A. Dunn
Attorney, Agent, or Firm—Ostrolenk, Faber, Gerb & Soffen

[57] ABSTRACT

A high resolution photostimulable storage phosphor screen for breast imaging using X-rays. The phosphor material for storing the image, SrS;Ce,Sm, is appropriately milled to a fine powder and dispersed, using appropriate methods, with high particle packing density, on a supporting substrate. The coated substrate froms a planar imaging screen for mammography. The phosphor screen of the present invention can record high quality digital (as opposed to analog) images for diagnostic breast imaging.

11 Claims, 4 Drawing Sheets

IMAGING SYSTEM FOR MAMOGRAPHY EMPLOYING ELECTRON TRAPPING MATERIALS

RELATED APPLICATIONS

This is a continuation-in-part of U.S. application Ser. No. 07/383,534, filed Jul. 24, 1989, now U.S. Pat. No. 5,028,793, entitled "Imaging Screen for Electrophoresis Applications", which is a continuation-in-part of U.S. application Ser. No. 07/203,324, filed Jun. 7, 1988, now U.S. Pat. No. 4,983,834, entitled "Large Area Particle Detector", which is a continuation-in-part of U.S. application Ser. No. 07/085,465, filed Aug. 14, 1987, now U.S. Pat. No. 4,812,660, entitled "Photolumi Materials for Outputting Yellow-Green Light and U.S. application Ser. No. 07/034,333, filed Mar. 3, 1987, now U.S. Pat. No. 4,822,520, entitled "Photoluminescent Materials for Outputting Blue-Green Light".

The disclosures of each of the above-noted related applications are herein incorporated by reference.

BACKGROUND OF THE INVENTION

1. Field of the Invention

The present invention relates to an imaging screen and readout system for mammography and, more particularly, to a mammography imaging system employing an electron trapping phosphor.

2. Description of the Related Art

Diagnostic mammography is a powerful tool for early detection of precancerous features in breasts. Historically, breast screening using X-rays was performed using radiographic film, without an intensifying screen. Although the method provided very high spatial resolution of breast features, a very high radiation dose to the patient was required to expose the film. Since the active layer on radiographic film is relatively thin (e.g., 20 micrometers), a high radiation exposure time was needed to allow the film to absorb a sufficient number of X-ray photons to obtain a high quality image. Presently, however, high resolution intensifying fluorescent screens have been developed which significantly reduce the radiation exposure to the breast With this approach, radiographic film is placed on top of the intensifying screen, which is farthest from the X-ray source. The X-rays which pass through the patient are first partially absorbed by the film, and the rest are more strongly absorbed by the intensifying screen. The X-rays absorbed by the intensifying screen cause the screen to fluoresce and further expose the film. In this way, the exposure to the patient is significantly reduced. In fact, the radiation exposure needed for the intensifying screen/film combination is very close to the minimum exposure needed to obtain a high quality image. That is, since there is inherently a statistical variation in the number of X-ray quanta, a specific minimum number need to pass through the patient and be absorbed by the imaging media to obtain an image with minimal noise. Therefore, increased sensitivity in the imaging media does not necessarily translate into a dose reduction, as this could produce a poor image where important features will become undetectable.

Therefore, the exposure sensitivity is not so much an issue, to the extent that radiation exposure is not increased relative to existing practices. Instead, it is important that the imaging media exhibit high contrast sensitivity and high spatial resolution to allow for the detection of small pre-cancerous features in breasts. These are usually microcalcifications, changes in tissue mass, or changes in blood flow, all low contrast features which must be detected. Unfortunately, since screen/film systems respond to linear contrast changes logarithmically, the previously stated features are not always easily detected. The logarithmic behavior of film basically means that a large contrast in the X-ray pattern will produce only a small contrast on the film. Therefore, a linear imaging media would be more desirable. Another important feature in the imaging media would be the ability to capture and record the X-ray image digitally. Being able to acquire images digitally would greatly simplify the archiving needs of the X-ray images, since they could be stored electronically. This would eliminate the need for massive physical storage of X-ray film. In addition, digital images can be manipulated to enhance features not easily detected with analog film images.

SUMMARY OF THE INVENTION

The present invention achieves the above-described goals by providing a system utilizing an imaging screen coated with a novel electron trapping material appropriately doped for optimal sensitivity to mammography radiation. The screen is exposed to a radiographic mammography image, so that the electron trapping material is charged with energy corresponding to the flux and pattern of the X-ray image. The screen is then scanned with light of a first wavelength to stimulate the electron trapping material to release the stored energy in the form of light of a second wavelength. The light released from the electron trapping material is then detected and converted to electrical signals representative of the flux and pattern of the mammography image.

The electron trapping material is preferably a strontium sulfide based material doped with a cerium compound and samarium (SrS:Ce,Sm). In a second embodiment, the material includes a cesium halide in addition to the cerium compound for optimum detection of the radiographic image.

The present invention overcomes many of the disadvantages of film. First, the SrS:Ce,Sm photostimulable storage phosphor utilized in the present invention as the imaging media responds to radiation exposure linearly. Further, X-ray images can be obtained from the new media digitally, without loss of information. Also, the SrS:Ce,Sm storage phosphor employed in the invention is reusable, so that the high costs associated with film can be eliminated. The key aspect of the invention, however, is that SrS:Ce,Sm storage phosphor can be fabricated such that: 1) high spatial resolution is achieved, comparable to better than screen/film combinations, and 2) high exposure sensitivity is simultaneously achieved to allow for the minimum possible patient radiation exposure.

It should be noted that storage phosphor screens based on barium fluorohalide phosphor material are currently commercially available for radiology. However, the resolutions which can be achieved with these systems are only about 8 lp/mm and not adequate for mammography, which requires better than 15 lp/mm. Also, other radiological imaging systems, such as digital fluoroscopy systems, are also not adequate because of their low resolution capabilities and the high radiation exposures needed.

BRIEF DESCRIPTION OF THE DRAWINGS

The above and other features and advantages of the present invention will become apparent when the following detailed description is read in conjunction with the accompanying drawings, in which.

DETAILED DESCRIPTION OF THE PREFERRED EMBODIMENT

(1.) The Electron Trapping Material

Figure 1:
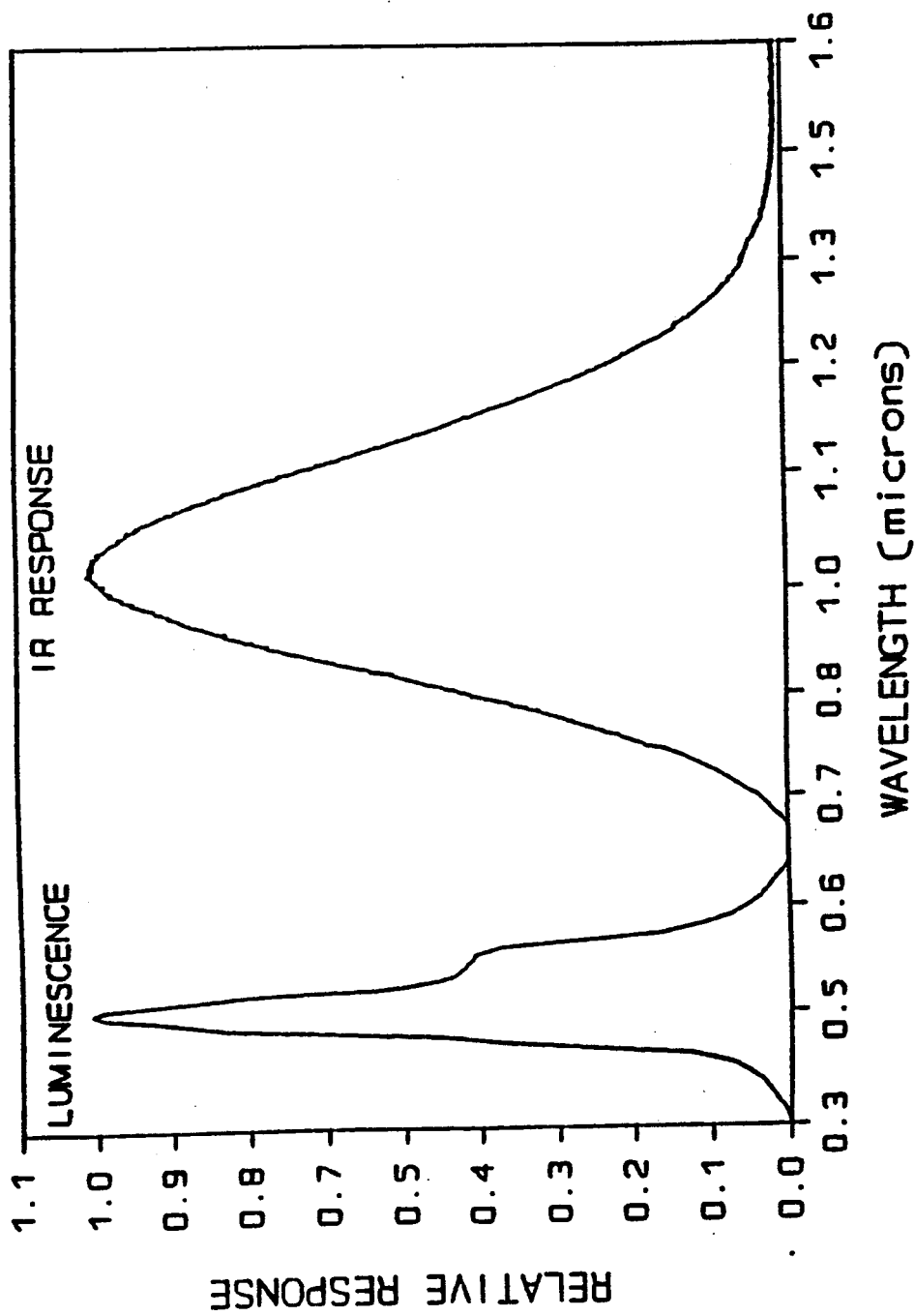
FIG. 1 shows the luminescence and infrared sensitivity spectra of the electron trapping phosphor utilized in the invention.

Before describing the details of the invention, it is worth first reviewing the physical processes occurring in the SrS:Ce,Sm electron trapping system during radiation exposure and subsequent near-IR stimulation. SrS is a wide-bandgap semiconductor and accommodates Sm and Ce ions, both initially in their 3+valency states. In these states, $Sm^{3+}$ is an electron trapping center and $Ce^{3+}$ is a luminescent center. When the SrS:Ce,Sm material is first exposed to ionizing radiation, bound electron hole pairs (excitons) are created; because of the coupling between the 5d level of $Ce^{3+}$ to the host crystal, excitons will preferentially recombine at these sites. This then results in the release of energy which excites a $Ce^{3+}$ ground state electron to its 5d state. Once in the 5d state, the electron can either undergo a transition back to the two ground states, $^2F_{7/2}$ and $^2F_{5/2}$ resulting in the emission of prompt fluorescence or it can tunnel to a neighboring $Sm^{3+}$ converting it to a $Sm^{2+}$ and leaving behind a $Ce^{4+}$. This charge exchange process results in the trapping of an electron at the $Sm^{2+}$, which is long lived; i.e., the electron can remain trapped at the $Sm^{2+}$ site for extended time periods. Further, the energy difference between the $Sm^{2+}$ ground state and its excited state is approximately 1 eV, so that by exposing the material to equivalent energy photons (e g., 1 m wavelength), the electron in the $Sm^{2+}$ ground state can be excited to its excited state. Once in this state, it can tunnel back to a neighboring $Ce^{4+}$, converting it to a $Ce^{3+}$ with an electron in the 5d excited state. Subsequent relaxation from the 5d level to the two ground states results in the emission of a luminescene band with a peak at 485 nm. FIG. 1 shows the luminescence wavelength band and the stimulation wavelength spectrum, showing a peak stimulation wavelength at approximately 1 Um.

Since the population of trapped electrons will be proportional to the X-ray exposure, it can be seen that the luminescence output is also proportional to the X-ray exposure. Further, the luminescence output from the material will be linear with the radiation exposure, making it ideal for X-ray imaging applications. Also, since the emission wavelength band and the near-IR stimulation wavelength are spectrally well separated, an optical detection system can be devised which is more efficient than those used for reading BaFBr:Eu phosphors, which exhibit emission and stimulation wavelengths very close together.

In order to obtain a high quality image, one key requirement is that a given X-ray screen absorb a sufficient number of X-ray photons. Although it is always possible to use a sufficiently thick phosphor layer to absorb the X-ray photons, there is the opposing requirement that the screen thickness should be sufficiently low to achieve high spatial resolution. In the present invention, it is in fact possible to achieve both goals: a sufficiently thin phosphor layer can be generated which exhibits high spatial resolution and adequate X-ray absorption.

In general, ensuring good photon statistics requires a 40–50% absorption of incident X-ray photons. Calculations were made to determine the amount of X-ray absorption in the SrS:Ce,Sm screens of different thicknesses. This was done by determining the energy absorption coefficients for SrS and the amount of X-ray energy absorption was calculated according to $A = 1 - \exp(-x\mu/\rho)$, where $\mu/\rho$ is the X-ray energy absorption coefficient and x is the phosphor mass thickness. $\mu/\rho$ values at 18 KeV X-ray energy where obtained from published data; 18 keV energy was chosen since this is the energy used in diagnostic mammography. The results of this analysis show that a 50 micrometer SrS:Ce,Sm phosphor layer thickness absorbs approximately 48% of incident 18 keV X-rays and a 100 micrometer thick layer absorbs approximately 70% of the incident radiation energy. These values are well within the range needed for maintaining good X-ray photon statistics. The next step is to verify that a 50 or 100 micrometer phosphor layer thickness will also exhibit sufficient spatial resolution. This was done by fabricating screens having various thicknesses and measuring their spatial resolution. For purposes of comparison, resolution has been defined as the spatial frequency (in Lp/mm) where a 10% modulation can be measured. Experimental results show that a 100 micrometer thick phosphor layer exhibits approximately a 22 Lp/mm spatial resolution (10% modulation). By contrast, screen/film systems exhibit a resolution of about 15 Lp/mm and BaFBr phosphors screens exhibit a limiting resolution of about 8 Lp/mm.

Figure 2:
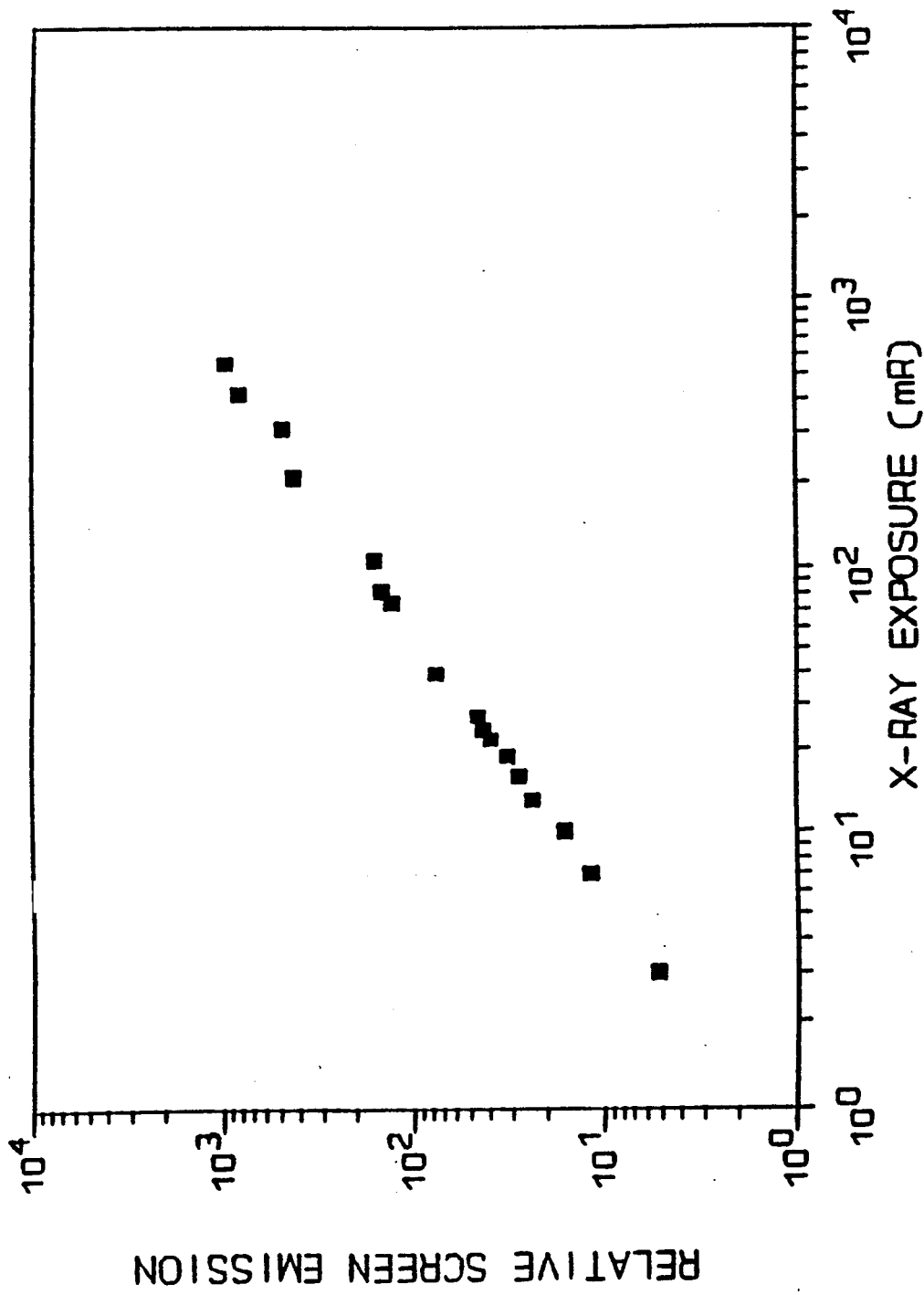
FIG. 2 shows the response of SrS:Ce,Sm electron trapping phosphor as a function of X-ray exposure at 52 kV$_p$.

In addition to the radiation absorption and spatial resolution characteristics, other parameters of the present invention have been measured. For example, the linearity and dynamic range of the phosphor screens were determined by measuring the number of photons actually detected by the optical detection system as a function of X-ray exposure (see FIG. 2). Measurements are shown for exposures between 3 mR and 550 mR showing a linear phosphor response to X-ray exposure. From the X-ray exposure response and S/N measurements, the minimum exposure sensitivity was also determined. The minimum phosphor exposure sensitivity is approximately 1 R. Published results for the BaFBr:Eu system indicate a minimum sensitivity of 10–100μR, so the screen of the present invention is at least a factor of ten more sensitive. Measurements also indicate that the dynamic range of the SrS:Ce,Sm phosphor system is approximately $10^6$. These results are clearly superior to screen/film systems and BaFBr phosphor systems. Further, the linear response and wide dynamic range of the SrS:Ce,Sm screen indicates that as long as the X-ray exposure is within the linear sensitivity range of the phosphor, over or under exposure cannot occur, since the gray level of the image can be scaled.

Figure 3:
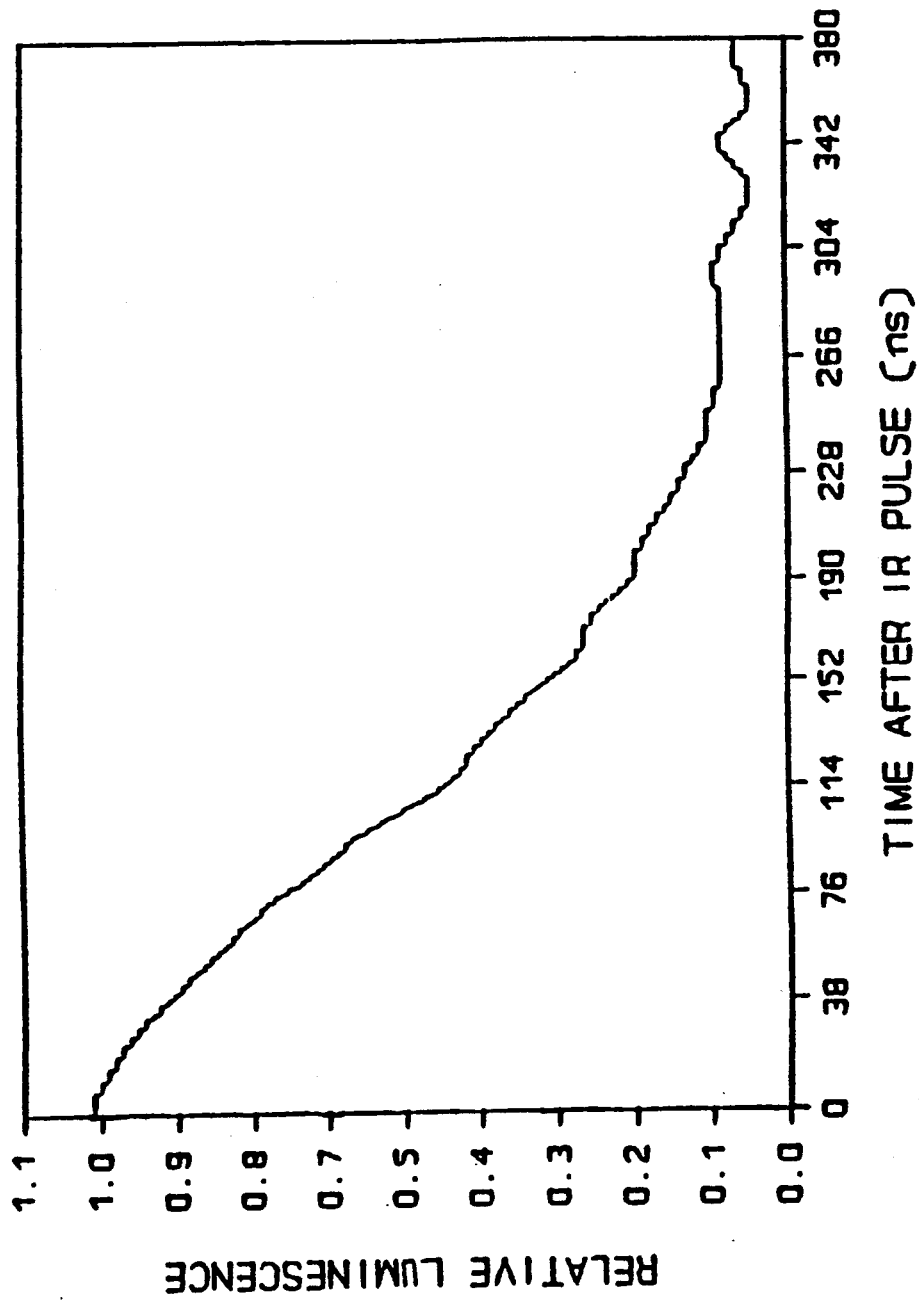
FIG. 3 shows the response time of the SrS:Ce,Sm electron trapping phosphor to an IR pulse

An additional improved property of the present invention relative to the BaFBr system is the response time of the SrS:Ce,Sm phosphor to an IR pulse. FIG. 3 shows that the fall time of the luminescence after the IR pulse is approximately 150 nanoseconds (1/e); similar measurements also indicate a rise time of 150 ns. This is faster than the BaFBr:Eu system which exhibits a response time of 1 μs. The fast response time of the SrS:Ce,Sm phosphor means that the IR laser can be scanned across the image screen faster, so that the stored image can be read more rapidly than from BaFBr:Eu screens.

Phosphor/screen fabrication

The preferred electron trapping material for use in the present invention is described in detail in U.S. Pat Nos. 4,822,520 and 4,855,603, the disclosures of which are herein incorporated by reference. The material described in U.S. Pat. No. 4,855,603 differs from the material described in U.S. Pat. No. 4,822,520 in that it includes a cesium halide in the mixture (SrS:Ce,Sm,Cs). However, both of these electron trapping materials have a high sensitivity to low energy X-rays such as used in mammography. For purposes of simplicity, both of these materials are referred to collectively hereafter as the SrS:Ce,Sm storage phosphor.

Several methods can be employed to fabricate SrS:Ce,Sm storage phosphor screens exhibiting the desired characteristics. The SrS:Ce,Sm storage phosphor material is prepared first in bulk ingot form. Once the polycrystalline ingot is prepared, it is ground to obtain powder. This can be achieved by ball milling, jet milling, or other known techniques. In addition, the ground powder may be annealed to repair the mechanical damage from milling and increase luminescence output. Typically, the particle size used for screen fabrication is between 1 and 10 micrometers; this range of particle sizes is needed to achieve the resolution requirements.

In order to achieve good resolution and luminescence output with fine particles, one screen fabrication method of the invention uses a tape casting process. This technique involves the preparation of a slurry containing the phosphor particles which is first ball milled to produce a homogeneous mixture of well dispersed particles of between 1-10 micrometers. Once properly mixed, the slurry is applied onto a suitable substrate, such as alumina, and allowed to dry in an inert atmosphere. The thickness of the coating of electron trapping material on the substrate is between 50-150 μm for optimum absorption and resolution requirements. The cast layer is then treated at elevated temperatures to sinter the particles to each other and to the substrate, as well as to remove the mechanical damage introduced during grinding Typically, screens can be sintered between 500° C. and 900° C., depending on the extent of mechanical damage. Alternatively, the ground powder can be sintered to repair the mechanical damage and increase luminescence. The powder can then be mixed with suitable organic binders (powder loading in binder of greater than 80% is derisrable) and applied to a thin semi-flexible substrate, such as mylar, without further heat treatment. Ideally, the substrate is formed of a material which will absorb the IR beam and not scatter it. The coated substrate is preferably encapsulated with a transparent overcoat for mechanical and environmental protection.

Optical Readout System

Figure 4:
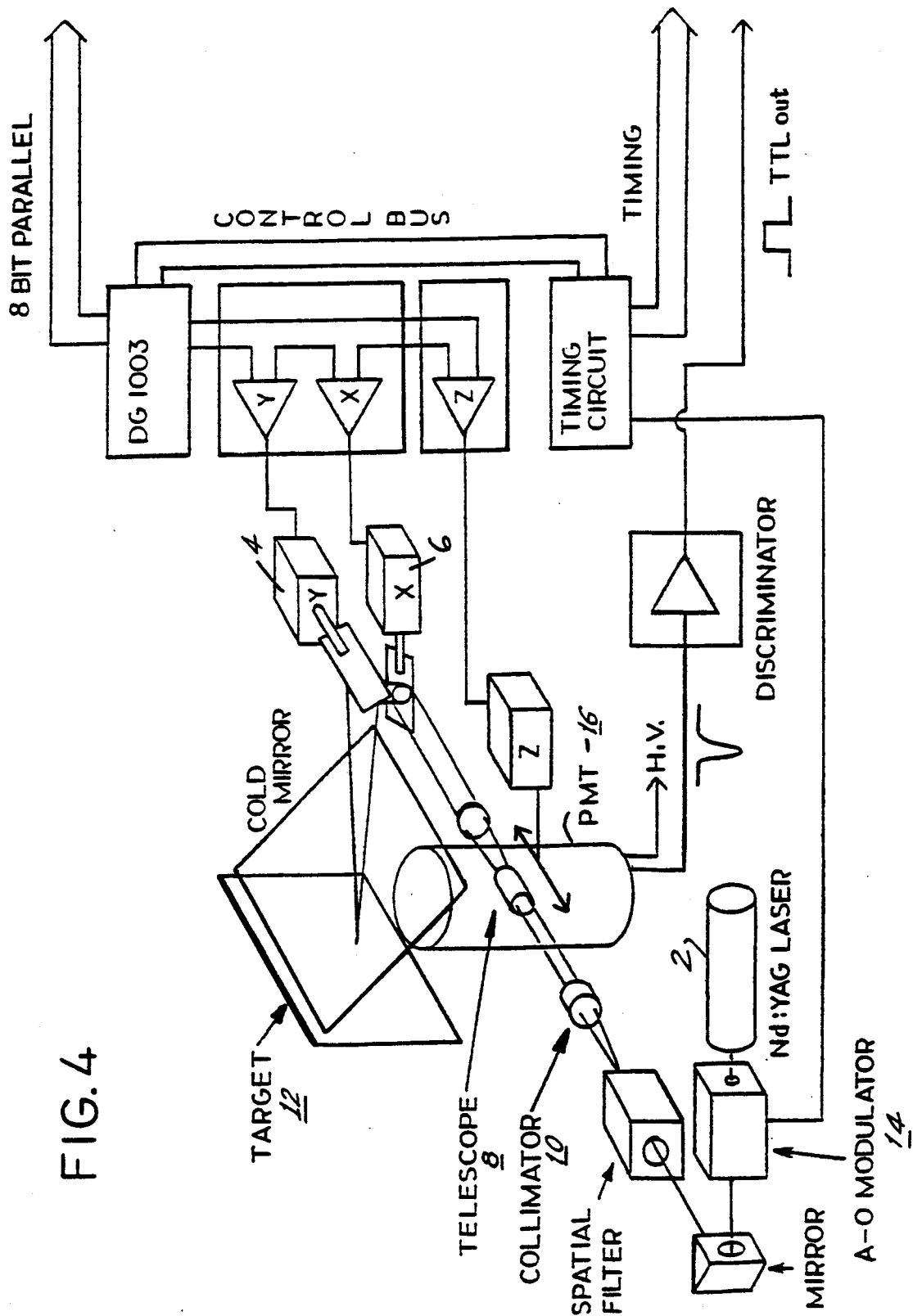
FIG. 4 shows the basic configuration of the laser scanner and optical detection system utilized in the present invention.

In order to read out a stored image from the phosphor screens, a laser scanner system can be used. One possible configuration for a scanning system is shown in FIG. 4. The scanner system consists of a 50 mW diode pumped Nd:YAG laser 2 emitting 1.064 m wavelength. Scanning mirrors 4,6 are used to step the IR beam and focusing optics 8,10 are used to a produce a beam size of 45μm (1/e$^2$) at the phosphor screen. An acousto-optic modulator 14 is used to set the IR beam dwell time per pixel. The visible luminescence emitted by the phosphor screen during IR stimulation is collected and propogated to a photomultiplier tube 16 (PMT). The PMT signal is then digitized and stored in computer memory as a function laser beam position on the screen. Once an entire screen 12 is scanned in this way, the stored data is processed and displayed on a CRT as an image, where the magnitude of the PMT signal from each screen pixel is converted into a suitable gray level for display. Although the scanning system shown involves a 2-dimensional scan of the beam across a stationary screen, it is also possible to scan the screen by other methods, such as single-axis beam raster and screen translation in an orthogonal direction.

The phosphor screen can be erased by simply flooding the screen with high intensity IR light to release all electrons from their traps.

The above-described system is presented as an example, and many modifications are possible. For example, laser diodes can be used in place of the Nd:YAG laser to supply IR light. Likewise, silicon photodetectors can be employed in place of the PMT to detect the visible light emission from the material.

Summary

The SrS:Ce,Sm electron trapping phosphor provides an excellent X-ray screen for mammography applications. The electron trapping X-ray storage phosphor exhibits superior exposure sensitivity and dynamic range relative to screen/film systems, with reduced dose to the patient. In addition, the electron trapping phosphor exhibits fast response and improved spatial resolution relative to existing commercial storage phosphor (BaFBr:Eu) systems.

Although the present invention has been described in connection with a preferred embodiment thereof, many other variations and modifications will now become apparent to those skilled in the art without departing from the scope of the invention. It is preferred, therefore, that the present invention not be limited by the specific disclosure herein, but only by the appended claims.

What is claimed is:

1. A mammography imaging system, comprising:
   means for detecting and storing a radiographic image, comprising an imaging screen coated with an electron trapping phosphor for releasably storing said image as energy corresponding to the flux and pattern of said image, said electron trapping phosphor comprising:
      a base material selected from the group of alkaline earth metal sulfides;
      a first dopant of samarium; and
      a second dopant of a cerium compound;
   means for scanning said imaging screen with optical energy of a first wavelength for causing said electron trapping phosphor coated thereon to release optical energy of a second wavelength corresponding to said flux and pattern of said image; and means for sensing the released optical energy of said second wavelength and for converting said released optical energy to electrical signals representative of said flux and pattern of said image.

2. The system of claim 1, wherein said optical energy of a first wavelength comprises infrared radiation.

3. The system of claim 2, wherein said infrared radiation is generated by a Nd:YAG laser.

4. The system of claim 1, wherein said optical energy of a second wavelength comprises visible light.

5. The system of claim 4, wherein said means for sensing said visible light comprises a photomultiplier tube.

6. The system of claim 1, wherein said electron trapping phosphor further comprises a third dopant of a cesium halide.

7. The apparatus of claim 1, wherein said alkaline earth metal sulfide comprises strontium sulfide.

8. The apparatus of claim 7, wherein said electron trapping phosphor further comprises a fusible salt.

9. An image screen for mammography, comprising:
a substrate coated with an electron trapping phosphor for detecting and storing a radiographic image, said electron trapping phosphor releasing optical energy of a second wavelength in a pattern corresponding to the stored radiographic image when subjected to optical energy of a first wavelength, said electron trapping phosphor comprising:
a base material selected from the group of alkaline earth metal sulfides;
a first dopant of samarium; and
a second dopant of a cerium compound.

10. A method for mammographic imaging, comprising the steps of:
exposing an imaging screen coated with an electron trapping phosphor to mammographic radiation to detect and store energy corresponding to flux and pattern of the radiation, said electron trapping phosphor comprising:
a base material selected from the group of alkaline earth metal sulfides;
a first dopant of samarium; and
a second dopant of a cerium compound;
subjecting said electron trapping phosphor to optical energy of first wavelength to cause said electron trapping phosphor to release optical energy of a second wavelength corresponding to said flux and pattern of said image; and
detecting the released optical energy of a second wavelength and converting said optical energy to electrical signals representative of said flux and pattern of said image.

11. The method of claim 10, further including the step of applying erase optical energy to said electron trapping phosphor for erasing the mammographic image stored thereon.

* * * * *